US012800747B2

(12) United States Patent
Mekki et al.

(10) Patent No.: US 12,800,747 B2
(45) Date of Patent: Nov. 17, 2026

(54) APPARATUS AND METHOD FOR COLLECTING AND AUTO-LABELLING MEASUREMENT DATA IN TRAFFIC SCENARIO

(71) Applicant: Yinwang Intelligent Technologies Co., Ltd., Shenzhen (CN)

(72) Inventors: Sami Mekki, Boulogne Billancourt (FR); Mustapha Amara, Boulogne Billancourt (FR); Songyu Yuan, Shenzhen (CN); Yutong Zhu, Shenzhen (CN); Zhixuan Wei, Shenzhen (CN); Xueming Peng, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 504 days.

(21) Appl. No.: 17/830,987

(22) Filed: Jun. 2, 2022

(65) Prior Publication Data

US 2022/0299627 A1 Sep. 22, 2022

Related U.S. Application Data

(63) Continuation of application No. PCT/CN2019/123052, filed on Dec. 4, 2019.

(51) Int. Cl.
*G01S 13/86* (2006.01)
*G01S 13/06* (2006.01)
(Continued)

(52) U.S. Cl.
CPC ............ *G01S 13/867* (2013.01); *G01S 13/06* (2013.01); *G01S 13/726* (2013.01); *G01S 13/89* (2013.01);
(Continued)

(58) Field of Classification Search
CPC ........ G01S 13/726; G01S 7/417; G01S 13/06; G01S 13/867; G01S 13/89; G01S 13/931;
(Continued)

(56) References Cited

U.S. PATENT DOCUMENTS 10,353,053 B2 7/2019 Rohani et al.
10,451,712 B1 10/2019 Madhow et al.
(Continued)

FOREIGN PATENT DOCUMENTS

CN 107238834 A 10/2017
CN 108921925 A 11/2018
(Continued)

OTHER PUBLICATIONS

DE-102018205964-A1 Machine translation (Year: 2019).*
(Continued)

*Primary Examiner* — Matthew M Barker
(74) *Attorney, Agent, or Firm* — Conley Rose, P.C.

(57) ABSTRACT

A sensing apparatus comprises one or more radar and/or lidar sensors configured to collect a plurality of position including distance and/or direction measurement values for a plurality of objects associated with a traffic scenario in the vicinity of the apparatus. The sensing apparatus further comprises a processing circuitry configured to obtain auxiliary data associated with one or more of the plurality of objects in the vicinity of the apparatus and to assign or map a respective position measurement value of the plurality of position measurement values to a respective object of the plurality of objects in the vicinity of the apparatus on the basis of the auxiliary data.

19 Claims, 11 Drawing Sheets

(51) Int. Cl.

| | |
|---|---|
| ***G01S 13/72*** | (2006.01) |
| ***G01S 13/89*** | (2006.01) |
| ***G01S 17/06*** | (2006.01) |
| ***G01S 17/86*** | (2020.01) |
| ***G01S 17/89*** | (2020.01) |
| ***G06V 20/58*** | (2022.01) |
| *G01S 7/41* | (2006.01) |
| *G01S 13/931* | (2020.01) |
| *G01S 17/931* | (2020.01) |

(52) U.S. Cl.
CPC .............. *G01S 17/06* (2013.01); *G01S 17/86* (2020.01); *G01S 17/89* (2013.01); *G06V 20/58* (2022.01); *G01S 7/417* (2013.01); *G01S 13/931* (2013.01); *G01S 17/931* (2020.01)

(58) Field of Classification Search
CPC .......... G01S 17/06; G01S 17/86; G01S 17/89; G01S 17/931; G06V 20/58
See application file for complete search history.

(56) References Cited

U.S. PATENT DOCUMENTS

| | | | | |
|---|---|---|---|---|
| 10,565,468 | B2 * | 2/2020 | Schiffmann | G01S 13/42 |
| 2004/0178945 | A1 * | 9/2004 | Buchanan | G06V 20/58 342/55 |
| 2015/0217765 | A1 | 8/2015 | Tokoro | |
| 2015/0324652 | A1 | 11/2015 | Mizutani | |
| 2016/0009284 | A1 * | 1/2016 | Tokimasa | B60W 10/10 701/96 |
| 2016/0223647 | A1 * | 8/2016 | Nichols | G01S 13/726 |
| 2017/0200273 | A1 * | 7/2017 | Kamilov | G01S 17/86 |
| 2017/0206436 | A1 | 7/2017 | Schiffmann | |
| 2017/0254895 | A1 * | 9/2017 | Tong | G01S 13/867 |
| 2018/0067489 | A1 | 3/2018 | Oder et al. | |
| 2018/0136332 | A1 * | 5/2018 | Barfield, Jr. | G06V 10/7784 |
| 2018/0308250 | A1 * | 10/2018 | Li | G01S 17/08 |
| 2019/0004533 | A1 * | 1/2019 | Huang | G01S 17/86 |
| 2019/0258876 | A1 * | 8/2019 | Liu | G06V 20/647 |
| 2019/0258878 | A1 | 8/2019 | Koivisto et al. | |
| 2019/0286915 | A1 * | 9/2019 | Patil | G06T 7/73 |
| 2020/0301013 | A1 * | 9/2020 | Banerjee | G01S 17/931 |
| 2020/0410750 | A1 * | 12/2020 | Huang | G01S 17/89 |
| 2021/0163021 | A1 * | 6/2021 | Frazzoli | H04W 4/48 |
| 2021/0406618 | A1 * | 12/2021 | Park | G06T 7/70 |

FOREIGN PATENT DOCUMENTS

| | | | |
|---|---|---|---|
| CN | 109683170 | A | 4/2019 |
| CN | 110110797 | A | 8/2019 |
| CN | 110208793 | A | 9/2019 |
| DE | 102018205964 | A1 * | 10/2019 |
| EP | 2793045 | A1 | 10/2014 |
| KR | 20010003423 | A | 1/2001 |
| WO | 2018220048 | A1 | 12/2018 |

OTHER PUBLICATIONS

De Silva V, Roche J, Kondoz A. Robust Fusion of LiDAR and Wide-Angle Camera Data for Autonomous Mobile Robots. Sensors (Basel). Aug. 20, 2018;18(8):2730. doi: 10.3390/s18082730. PMID: 30127253; PMCID: PMC6112019. (Year: 2018).*

M. H. Daraei, A. Vu and R. Manduchi, “Velocity and shape from tightly-coupled LiDAR and camera,” 2017 IEEE Intelligent Vehicles Symposium (IV), Los Angeles, CA, USA, 2017, pp. 60-67, doi: 10.1109/IVS.2017.7995699. (Year: 2017).*

Kiangyu Yue et al, “A LiDAR Point Cloud Generator: from a Virtual World to Autonomous Driving,” 2018, 7 pages.

Yan Wang et al. “Anytime Stereo Image Depth Estimation on Mobile Devices,” Mar. 2019, 8 pages.

Mark Martinez, “Beyond Grand Theft Auto V for Training, Testing and Enhancing Deep Learning in Self Driving Cars,” 2017, 15 pages.

Jernej Mrovlje et al., “Distance measuring based on stereoscopic pictures,” 9th International PhD Workshop on Systems and Control: Young Generation Viewpoint, 2008, 6 pages.

Manaf A. Mahammed et al., “Object Distance Measurement by Stereo Vision,” International Journal of Science and Applied Information Technology (IJSAIT), vol. 2 , No. 2, 2013, 5 pages.

Stephan Richter et al., “Playing for Data: Ground Truth from Computer Games,” TU Darmstadt and Intel Labs, 2016, 16 pages.

Yan Wan et al, “PointSeg: Real-Time Semantic Segmentation Based on 3D LiDAR Point Cloud,” Sep. 2018, 7 pages.

Yan Wan et al, “Pseudo-LiDAR from Visual Depth Estimation: Bridging the Gap in 3D Object Detection for Autonomous Driving,” Apr. 2019, 9 pages.

* cited by examiner

APPARATUS AND METHOD FOR COLLECTING AND AUTO-LABELLING MEASUREMENT DATA IN TRAFFIC SCENARIO

CROSS-REFERENCE TO RELATED APPLICATIONS

This application is a continuation application of International Patent Application No. PCT/CN2019/123052, filed on Dec. 4 2019, the disclosure of which is hereby incorporated by reference in its entirety.

TECHNICAL FIELD

The disclosure relates to a sensing apparatus. More specifically, the disclosure relates to a sensing apparatus and a method for collecting and auto-labelling measurement data in a traffic scenario involving one or more vehicles.

BACKGROUND

Autonomous self-driving is being deployed by several car manufacturers. A self-driving vehicle comprises sensors such as cameras, radio detection and ranging (radar) sensors, light detection and ranging (lidar) sensors, Global Positioning System (GPS) sensors and the like. These sensors create large amounts of data.

Lidar and radar sensors usually generate un-labelled raw point cloud data that needs to be processed by various algorithms for, among other purposes, object detection and recognition. Developing and evaluating the performance of such algorithms may be involve the use of ground truth information of each point cloud. A labelled point cloud may be used to determine whether a given point of the point cloud is associated with, for instance, a car, bus, pedestrian, motorcycle or another type of object. Simulated environments based on mathematical models do not fully reflect the real reflectivity properties of surfaces when a radar or lidar based algorithm is evaluated.

Therefore, radar or lidar based algorithms are assessed with a labelled point cloud in order to ensure an objective performance evaluation, without having to rely only on the human perception for evaluation and comparison. Thus, in a traffic scenario it is a challenge to collect and generate a labelled point cloud dataset captured through radar or lidar sensors in an automated manner, and generate a ground truth information necessary for objectively evaluating the performance of a radar or lidar based algorithm.

In conventional approaches to point cloud processing, the performance evaluation is based on the human eye by comparing detected objects to a camera feed.

Stephan Richter et al., "Playing for Data: Ground Truth from Computer Games", TU Darmstadt and Intel Labs, 2016, (link:http://download.visinf.tu-darmstadt.de/data/from_games/) discloses using a labelled point cloud dataset, where the data are synthetized from a computer game and where the ground truth and identity of each object is generated from the simulator. Then, based on mathematical models, a radar or lidar point cloud is generated from the identified objects in order to develop an appropriate algorithm for each sensor type (see Xiangyu Yue et al. "A LiDAR Point Cloud Generator: from a Virtual World to Autonomous Driving", June 2018; https://parnsf gov/servlets/purl/10109208). Furthermore, algorithms for self-driving cars are also tested using the simulated environment provided by a computer game (see Mark Martinez, "Beyond Grand Theft Auto V for Training, Testing and Enhancing Deep Learning in Self Driving Cars", A MASTER'S THESIS, PRINCETON UNIVERSITY, June 2018). However, simulated radar and lidar data are based on mathematical models that try to mimic electromagnetic wave propagation in a real-life traffic scenario. These models are based on numerous assumptions and simplifications that render synthetic data different from real-life measurements especially in complex environments, e.g. environments with multiple propagation paths and reflective structures.

The generation of reflected signals in a multipath propagation environment is mainly based on ray tracing techniques, where space is discretized in multiple paths selected based on the primary detected objects. This discretization provides a limited view of what is really reflected, because small objects (of interest for radar systems) have a non-negligible impact (e.g. in discretized ray tracing techniques road borders are neglected, while buildings are not). In addition, when these reconstruction techniques are used, many assumptions about the type of materials are made and the closest permittivity and permeability are selected among a pool of available values. All these approximations add an extra layer of incertitude and errors on the simulated reflected signals/data which render the obtained results very far from reality.

In Yan Wan et al. "Pseudo-LiDAR from Visual Depth Estimation: Bridging the Gap in 3D Object Detection for Autonomous Driving", (Conference on Computer Vision and Pattern Recognition (CVPR) 2019 in Long Beach, California, Jun. 16-20 2019) the lidar signal/data is mimed from image input in order to apply a lidar based algorithm for object detection and identification.

A stereoscopic camera was used in Yan Wang et al. "Anytime Stereo Image Depth Estimation on Mobile Devices", May 2019 (https://ieeexplore.ieee.org/abstract/document/8794003/) in order to test the depth estimation and compare it to lidar measurements. The point cloud used here was for determining a distance ground truth.

In Yan Wang et al. "PointSeg: Real-Time Semantic Segmentation Based on 3D LiDAR Point Cloud", September 2018 (https://arxiv.org/abs/1807.06288) a convolutional neural network is applied to a spherical image generated from a dense 3D lidar point cloud. The machine learning algorithm was trained with spherical images and labelled based on a mask dataset generated for images.

KR1020010003423 discloses an apparatus and method for generating object label images in a video sequence not making use of radar or lidar data.

CN108921925A discloses object identification by applying data fusion between camera and lidar data. The lidar data is labelled after processing, i.e. a high-level labelling is performed.

SUMMARY

It is an object of the disclosure to provide a sensing apparatus and method allowing to accurately label the un-labelled point cloud data provided by radar and/or lidar sensors in a traffic scenario involving one or more vehicles.

The foregoing and other objects are achieved by the subject matter of the independent claims. Further implementation forms are apparent from the dependent claims, the description and the figures.

Generally, the disclosure provides a sensing apparatus and method for an automatic labelling of collected low-level, e.g. raw point cloud data generated by radar or lidar sensors in a traffic scenario involving one or more vehicles. The sensing apparatus may be implemented as a component of one of the vehicles involved in the traffic scenario or as a stand-alone unit. The sensing apparatus and method take advantage of external resources of information/data that may be collected by means of other sensors available on the vehicle, such as, but not limited to, image capturing sensors, such as single/multiple, simple/stereoscopic cameras, internal sensors such as, but not limited to, accelerometers, magnetometers, gyroscope sensors, odometers, GPS sensors, or sensors for assessing the wireless communication infrastructure in the environment of the traffic scenario.

In an example, according to a first aspect the disclosure relates to a sensing apparatus, comprising one or more radar and/or lidar sensors configured to collect a plurality of position, e.g. distance and/or direction measurement values for a plurality of objects associated with a traffic scenario in the vicinity of the apparatus; and a processing circuitry configured to obtain auxiliary data associated with one or more of the plurality of objects in the vicinity of the apparatus and to assign, e.g. map a respective position measurement value of the plurality of position measurement values to a respective object of the plurality of objects in the vicinity of the apparatus on the basis of the auxiliary data. The sensing apparatus may be implemented as a component of a vehicle, e.g. a car. Advantageously, the sensing apparatus allows taking advantage of additional resources of information for labelling the raw data, e.g. the plurality of measurement values for a plurality of objects associated with the traffic scenario in the vicinity of the apparatus.

In a further possible implementation form of the first aspect, the auxiliary data comprises one or more images of the one or more of the plurality of objects in the vicinity of the apparatus. Advantageously, this allows the sensing apparatus to implement efficient image processing techniques for identifying the objects in the vicinity of the apparatus in the one or more images and mapping the plurality of position measurement values to the identified objects.

In a further possible implementation form of the first aspect, the sensing apparatus further comprises one or more cameras configured to capture the one or more images of the one or more of the plurality of objects in the vicinity of the apparatus. Advantageously, this allows the sensing apparatus to be easily integrated in an already existing hardware structure of a vehicle including one or more cameras, such as a dashboard camera of the vehicle.

In a further possible implementation form of the first aspect, the one or more cameras comprise a stereoscopic camera configured to capture the one or more images as one or more stereoscopic images of the one or more of the plurality of objects in the vicinity of the apparatus and/or an omnidirectional camera configured to capture the one or more images as one or more omnidirectional images of the one or more of the plurality of objects in the vicinity of the apparatus. In case of a stereoscopic camera, this allows the sensing apparatus to determine a distance of the identified object as well and, therefore, to provide a more accurate mapping of the plurality of position measurement values to the identified objects. In case of an omnidirectional camera, the sensing apparatus may identify all or nearly all objects in the vicinity of the sensing apparatus and, thereby, provide a more complete mapping of the plurality of position measurement values to the identified objects.

In a further possible implementation form of the first aspect, the processing circuitry is configured to determine on the basis of the one or more images a respective auxiliary position, e.g. distance and/or direction value for a respective object of the one or more of the plurality of objects in the vicinity of the apparatus and to assign a respective position measurement value of the plurality of position measurement values to a respective object of the plurality of objects in the vicinity of the apparatus on the basis of the respective auxiliary position value of the respective object of the one or more of the plurality of objects in the vicinity of the apparatus. Advantageously, this allows the sensing apparatus to provide a more accurate mapping of the plurality of position measurement values to the identified objects in the vicinity of the apparatus.

In a further possible implementation form of the first aspect, the processing circuitry is further configured to identify on the basis of the one or more images a respective object of the one or more of the plurality of objects in the vicinity of the apparatus. Advantageously, this allows the sensing apparatus to implement efficient image processing techniques for identifying the objects in the vicinity of the apparatus in the one or more images and mapping the plurality of position measurement values to the identified objects.

In a further possible implementation form of the first aspect, the processing circuitry is further configured to implement a neural network for identifying on the basis of the one or more images a respective object of the one or more of the plurality of objects in the vicinity of the apparatus. Advantageously, this allows the neural network implemented by the sensing apparatus to be trained in advance on the basis of training data and/or in use on the basis of real data and, thereby, provide a more accurate object identification.

In a further possible implementation form of the first aspect, the processing circuitry is further configured to determine on the basis of the one or more images a respective angular extension value of a respective object of the one or more of the plurality of objects in the vicinity of the apparatus and to assign a respective position measurement value of the plurality of position measurement values to a respective object of the plurality of objects in the vicinity of the apparatus on the basis of the respective angular extension value of the respective object of the one or more of the plurality of objects in the vicinity of the apparatus. Advantageously, this allows the sensing apparatus to provide a more accurate mapping of the plurality of position measurement values to the identified objects in the vicinity of the apparatus.

In a further possible implementation form of the first aspect, the one or more images comprise a temporal sequence of images of the one or more of the plurality of objects in the vicinity of the apparatus, wherein the one or more radar and/or lidar sensors are further configured to collect based on the Doppler effect a plurality of velocity measurement values for the plurality of objects in the vicinity of the apparatus, wherein the processing circuitry is further configured to determine on the basis of the temporal sequence of images a respective auxiliary velocity value of a respective object of the one or more of the plurality of objects in the vicinity of the apparatus and to assign a respective position measurement value of the plurality of position measurement values to a respective object of the plurality of objects in the vicinity of the apparatus on the basis of the plurality of velocity measurement values for the plurality of objects in the vicinity of the apparatus and the respective auxiliary velocity value of the respective object of the one or more of the plurality of objects in the vicinity of the apparatus. Advantageously, this allows the sensing apparatus to provide a more accurate mapping of the plurality of position measurement values to the identified objects in the vicinity of the apparatus.

In a further possible implementation form of the first aspect, the auxiliary data comprises data provided by an accelerometer sensor, a magnetometer sensor, a gyroscope sensor, an odometer sensor, a GPS sensor, an ultrasonic sensor, and/or a microphone sensor, map data of the vicinity of the apparatus, and/or network coverage data in the vicinity of the apparatus. These sensors may be implemented as a component of the sensing apparatus or as a component of the vehicle the sensing apparatus is implemented in. Advantageously, this allows the sensing apparatus to be easily integrated in an already existing hardware structure of a vehicle including one or more of these sensors.

According to a second aspect the disclosure relates to a sensing method, comprising the steps of collecting by one or more radar and/or lidar sensors of an apparatus a plurality of position, e.g. distance and/or direction measurement values for a plurality of objects of a traffic scenario in the vicinity of the apparatus; obtaining auxiliary data associated with one or more of the plurality of objects in the vicinity of the apparatus; and assigning, e.g. mapping a respective position measurement value of the plurality of position measurement values to a respective object of the plurality of objects in the vicinity of the apparatus on the basis of the auxiliary data.

The sensing method according to the second aspect of the disclosure can be performed by the sensing apparatus according to the first aspect of the disclosure. Further features of the sensing method according to the second aspect of the disclosure result directly from the functionality of the sensing apparatus according to the first aspect of the disclosure and its different implementation forms described above and below.

According to a third aspect the disclosure relates to a computer program comprising program code which causes a computer or a processor to perform the method according to the second aspect when the program code is executed by the computer or the processor. The computer program may be stored on a non-transitory computer-readable storage medium of a computer program product. The different aspects of the disclosure can be implemented in software and/or hardware.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, aspects of embodiments of the disclosure or aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Figure 1:
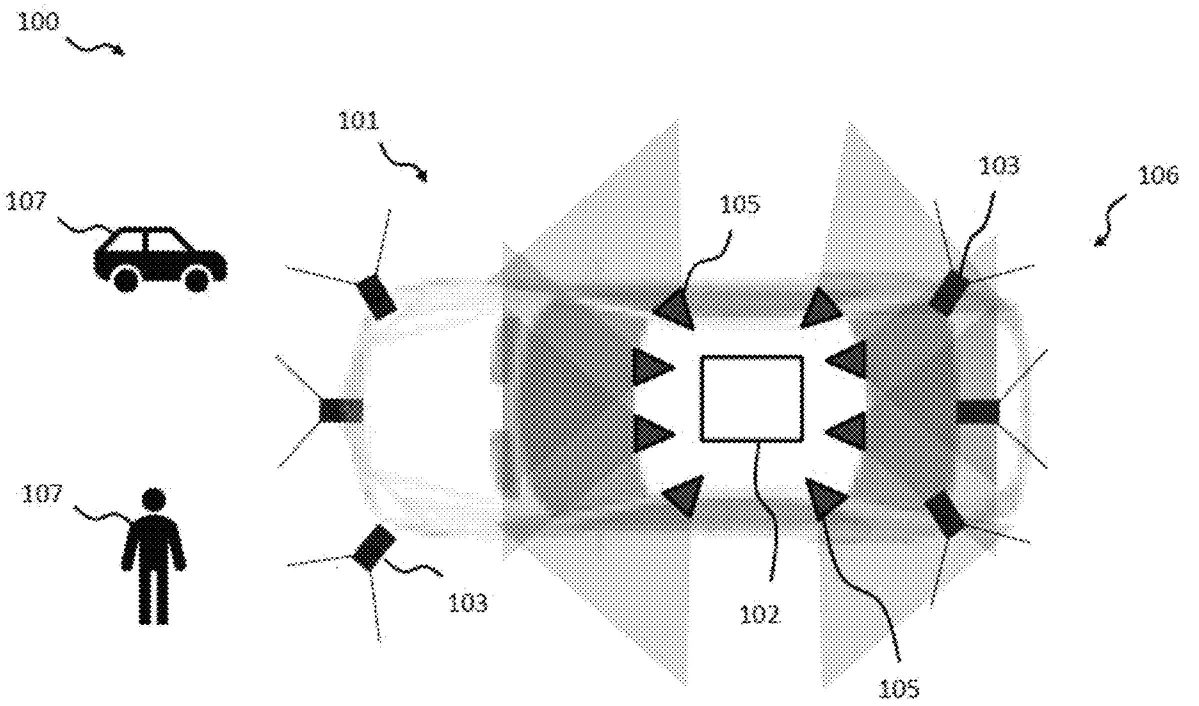
FIG. 1 shows a schematic diagram illustrating a sensing apparatus according to an embodiment for collecting and processing data in a traffic scenario.

FIG. 1 is a schematic diagram illustrating an exemplary sensing apparatus 101 that in this embodiment is implemented as a component of a car 106. In other embodiment, the sensing apparatus 101 may be a stand-alone unit, such as a unit wearable by a user.

As illustrated in FIG. 1, the sensing apparatus 101 (which in this embodiment is a component of the car 106) is configured to collect and process data about a traffic scenario 100. In the exemplary embodiment of FIG. 1 the traffic scenario 100 involves in addition to the car 106 and, thus, the sensing apparatus 101, by way of example, a plurality of objects 107 in a vicinity of the car 106, e.g. the sensing apparatus 101, such as other cars, pedestrians and the like. Each of the plurality of objects 107 in the vicinity of the sensing apparatus 101 has a well-defined position, e.g. a distance and a direction relative to the sensing apparatus 101 and may be in motion or stationary relative to the sensing apparatus 101 (which usually may be moving as well).

For collecting data about the respective positions of the plurality of objects 107 involved in the traffic scenario 100 the sensing apparatus 101 comprises one or more radar and/or lidar sensors 103. In the embodiment shown in FIG. 1, the sensing apparatus 101 comprises, by way of example, six radar and/or lidar sensors 103 (referred to as R1 to R6 in FIG. 1) arranged at different positions of the car 106 such that the radar and/or lidar sensors 106 are configured to collect a plurality of position, e.g. distance and/or direction measurement values for the plurality of objects 107 in all directions around the car 106 (e.g. omni-directional). As will be appreciated, in other embodiments the sensing apparatus 101 may comprise more or less than six radar and/or lidar sensors 103.

Moreover, the sensing apparatus 101 comprises a processing circuitry 102 configured to perform, conduct or initiate various operations of the sensing apparatus 101 described in the following. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the apparatus 101 to perform, conduct or initiate the operations or methods described below.

In particular, the processing circuitry 102 is configured to obtain auxiliary data associated with the plurality of objects 107 in the vicinity of the car 106 and to assign, e.g. map a respective position measurement value of the plurality of position measurement values provided by the radar and/or lidar sensors 103 to a respective object of the plurality of objects 107, as will be described in more detail further below.

In the embodiment shown in FIG. 1 the sensing apparatus 101 further comprises a plurality of cameras 105, wherein each camera 105 is configured to capture images and/or videos of the objects 107 in the vicinity of the apparatus 101 According to an embodiment, these images and/or videos are used by the processing circuitry 102 as the auxiliary data associated with the plurality of objects 107 for mapping a respective position measurement value of the plurality of position measurement values provided by the radar and/or lidar sensors 103 to a respective object of the plurality of objects 107.

In the embodiment shown in FIG. 1, the sensing apparatus 101, by way of example, comprises eight cameras 105 arranged at different positions of the car 106 such that the cameras 105 may obtain image/video data for the plurality of objects 107 in all directions around the car 106 (e.g. omni-directional). As will be appreciated, in other embodiments the sensing apparatus 101 may comprise more or less than eight cameras 105. For instance, instead of a plurality of two-dimensional cameras 105 arranged to provide an omni-directional view around the car 106, the sensing apparatus 101 may contain a single omni-directional, e.g. three-dimensional camera 105 arranged, for instance, on the roof of the car 106.

Figure 2:
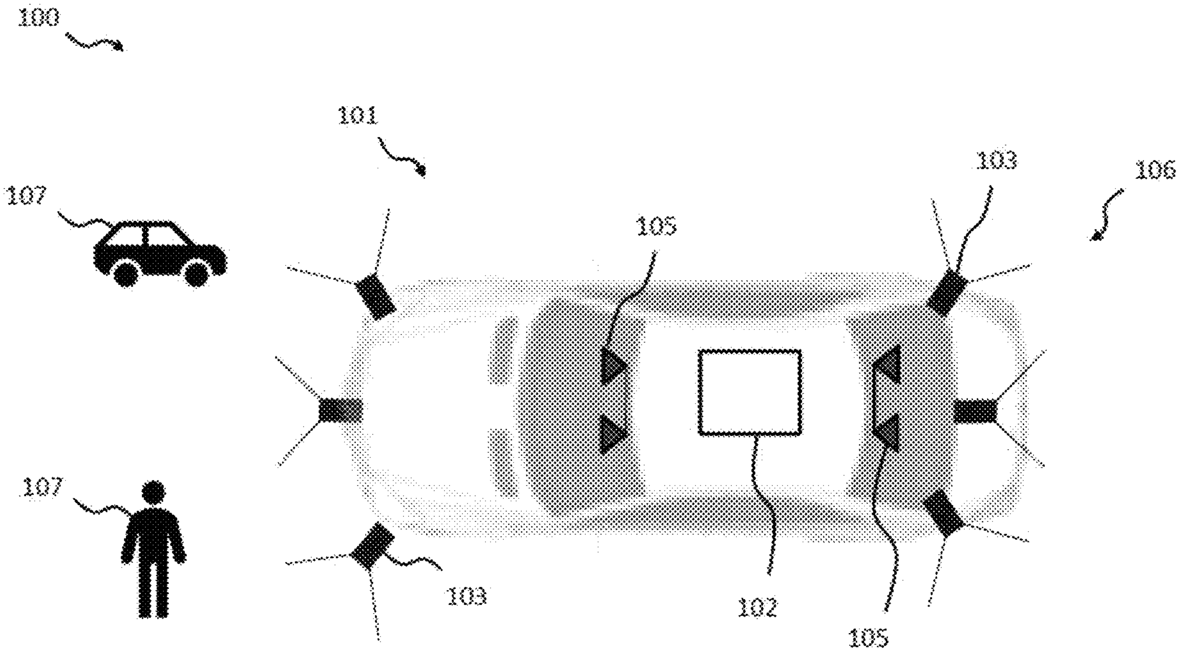
FIG. 2 shows a schematic diagram illustrating a sensing apparatus according to a further embodiment for collecting and processing data in a traffic scenario.

In a further exemplary embodiment shown in FIG. 2, the sensing apparatus 101 comprises a set of stereoscopic cameras 105, which may provide distance information about the plurality of objects 107 as well.

The radar and/or lidar measurements and the auxiliary data, for instance, image data constitute two synchronized sets of data, namely a first set consisting of a random set of sparse data acquisitions/measurements provided by the radar and/or lidar sensors 103 and a second set consisting of the auxiliary data, e.g. a sequence of images provided by the cameras 105 and containing information about plurality of objects 107 involved in the traffic scenario 100 in the vicinity of the car 106. According to an exemplary embodiment, the processing circuitry 102 of the sensing apparatus 101 may be configured to identify and label the sparse point cloud data by implementing the following processing stages.

1. Processing the image feeds constituting the auxiliary data in order to identify the position and type of each object 107 in the vicinity of the car 106;

2. Superposing the map of identified objects through the processing of the camera feed with the synchronized acquired point cloud data provided by the radar and/or lidar sensors 103;

3. Identifying a mapping between the point cloud elements and the objects 107 that are identified and generated through the image processing in step 1.

4. Label the point cloud accordingly.

Although in the example described above the auxiliary data comprises image data of the objects 107 in the vicinity of the car 106, it will be appreciated that other types of data providing information about the objects 107 in the vicinity of the car 106 may be used as auxiliary data in addition to or instead of the image data. For instance, the auxiliary data may be obtained by the sensing apparatus 101 at the level of the car 106, such as odometry data, positioning data provided by external sources such as maps, and/or wireless network information, such as information wireless network heatmaps providing information about wireless network coverage. According to an embodiment, any data may be used as auxiliary data for labelling the point data points provided by the radar and/or lidar sensors 103, wherein the data has the following properties.

1. The data is or can be synchronized with the point cloud data acquired by the radar and/or lidar sensors 103.

2. The data can be efficiently processed by the processing circuitry 102 of the sensing apparatus 101 using suitable processing techniques that provide a reliable recognition of the objects 107 in the vicinity of the car 106.

As will be appreciated, the above exemplary embodiment may be extended to multiple sources and/or types of auxiliary data, irrespective of whether they are of the same type or heterogeneous in nature. The various sources of auxiliary data can be either considered as complementary in order to enhance the coverage, the granularity of the detection and/or the quality of the detection through data fusion techniques.

Using one or more of the techniques described above, the sensing apparatus 101 allows generating a database associated with a real-world traffic scenario 100 with real-world data containing point cloud information that are labeled based on reliable identification techniques. The generated database may be used, for instance, for point cloud algorithm design with an embedded reliable baseline that provides objective performance evaluation. It should be noted that the sensing apparatus 101 provides for an automated point cloud labelling at low level, e.g. labelling raw data, using the auxiliary data. The sensing apparatus 101 does not process the point cloud data provided by the radar and/or lidar sensors 103 for object identification, rather only the auxiliary data, e.g. information from other sources than the radar and/or lidar sensors 103 are taken into account for object identification and labelling of the point cloud on the basis thereof.

Figure 3:
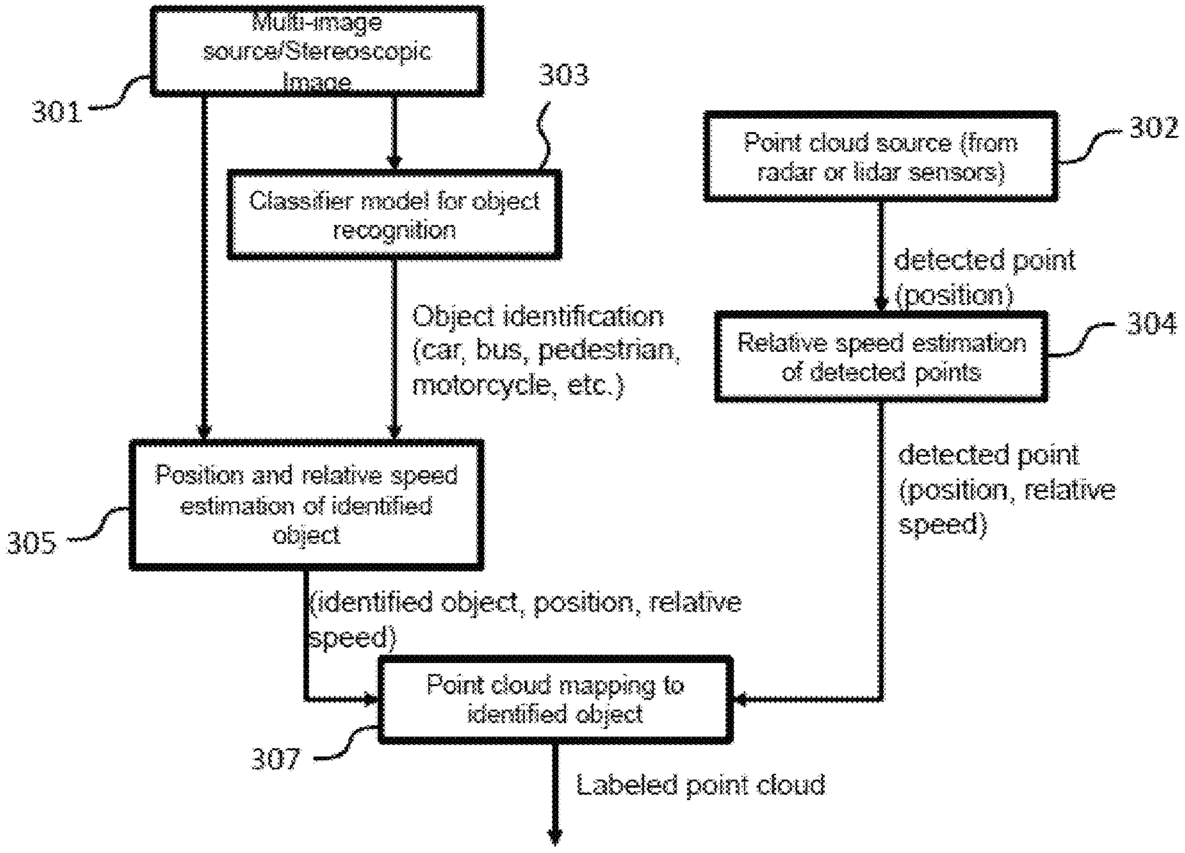
FIG. 3 is a flow diagram illustrating processing steps implemented by a sensing apparatus according to an embodiment.

FIG. 3 is a flow diagram illustrating in more detail processing steps implemented by the sensing apparatus 101 according to an embodiment, wherein in this embodiment the auxiliary data comprises image data provided by the plurality of cameras 105, preferably image data covering the complete environment of the car 106 (see processing block 301 in FIG. 3).

These images are fed to a machine learning algorithm for object detection and classification as implemented by processing block 303 of FIG. 3. Once the objects 107 in the vicinity of the apparatus 101 have been identified, their respective distance to the car 106 may be estimated in processing block 305 of FIG. 3 using the multi-camera images. For suitable distance estimation techniques using image data provided by multiple cameras 105 or a stereoscopic camera 105 reference is made, for instance, to Manaf A. Mahammed, Amera I. Melhum, Faris A. Kochery, "Object Distance Measurement by Stereo VISION", International Journal of Science and Applied Information Technology (IJSAIT), Vol. 2, No. 2, Pages: 05-08, 2013 or Jernej Mrovlje and Damir Vrančić "Distance measuring based on stereoscopic pictures", 9th International PhD Workshop on Systems and Control: Young Generation Viewpoint, 2003. The distance estimation based on only one camera 105 is also possible with higher computational complexity. In addition to distance, the processing circuitry 102 of the apparatus 101 in an embodiment may be configured to determine the angle of the detected object 107 relative to a reference direction as well as an angular range spanned by the object 107. The nominal direction may be inferred from the position of the camera 105 on the vehicle 106 and an absolute angle may be determined. Image processing techniques then allow providing the relative angle and an angular spread.

According to a further embodiment, the processing circuitry 102 of the apparatus 101 may be further configured to determine the relative speed and the radial speed of an identified object 107 relative to the car 106 and, consequently, the apparatus 101, by measuring the change of the distance of an identified object 107 from the car 106 in consecutive image frames.

Once the distance and the speed have been determined for each of the detected objects 107, the processing circuitry 102 of the apparatus 101 is configured to, in processing block 307, map the point cloud of data obtained from the radar and/or lidar sensors 103 in processing block 302 of FIG. 3 to the identified object 107 by just comparing the distance obtained by the radar and/or lidar sensors 103 with the distance determined in processing block 305 on the basis of the auxiliary image data. According to an embodiment, this mapping may also take into account the relative speed determined in processing block 304 of FIG. 3 (based on the Doppler effect) on the basis of the raw data provided by the radar and/or lidar sensors 103. This can improve the accuracy of the mapping, e.g. the point cloud labelling, in case a big difference is noticed between the position measured by the radar and/or lidar sensors 103 and the distance estimation performed on the basis of the auxiliary image data.

As will be appreciated and as already mentioned above, in the exemplary embodiment shown in FIG. 3 the point cloud, e.g. the raw data provided by the radar and/or lidar sensors 103 is not processed for object identification. However, as described above, these measurements obtained by the radar and/or lidar sensors 103 may be used in order to estimate the relative speed of each detected point to ease mapping the point cloud to the identified objects 107.

In the following, two exemplary embodiments will be described in the context of FIGS. 4 to 11 that illustrate how the processing circuitry 102 of the sensing apparatus 101 may take advantage of auxiliary data/information often available in a vehicle, such as the vehicle 106 in order to identify and automatically label raw point cloud data obtained from the radar sensors 103. In the first exemplary embodiment image/video data is used as the auxiliary data, while in the second exemplary embodiment odometry and GPS data is used as the auxiliary data.

In the first exemplary embodiment, which will be described in more detail in the context of FIGS. 4 to 8, image/video data provided by a two-dimensional camera 105 is used as auxiliary data by the processing circuitry 102 of the apparatus 101. As will be appreciated, the example of the two-dimensional camera 105 can be easily applied to multiple synchronized cameras 105, omnidirectional cameras 105 or stereoscopic cameras 105 that cover the surrounding environment of the car 106. The simple case of a single two-dimensional camera 105 is just used for illustration purposes.

Figure 4:
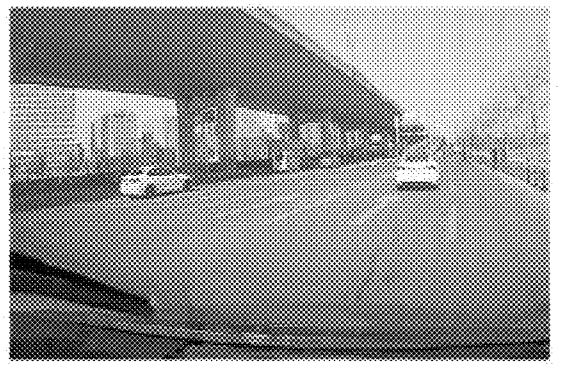
FIG. 4 shows an exemplary image of a traffic scenario captured by a camera of a sensing apparatus according to an embodiment.
Figure 5:
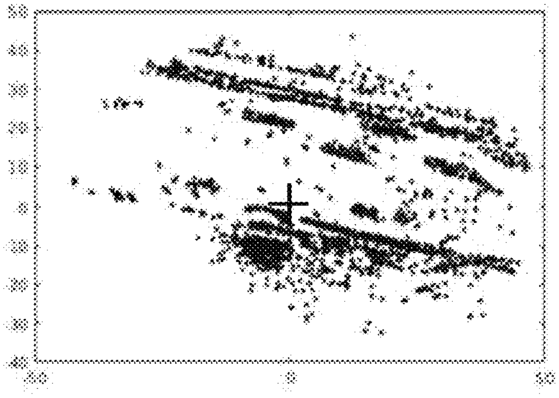
FIG. 5 shows an exemplary point cloud of unlabeled radar data collected by a sensing apparatus for the traffic scenario shown in FIG. 4.

FIG. 4 shows an image frame at a certain point in time, while FIG. 5 displays the point cloud, e.g. raw data provided by the radar sensors 103 at the same point in time. The cross in FIG. 5 corresponds to the position of the moving car 106, while the other points are the collected data, e.g. position measurements provided by the radar sensors 103. As described previously in the context of the embodiment shown in FIG. 3, each data point may be identified based on the distance and the angle from which the radar sensors 103 received the corresponding reflected signal. By way of example, FIG. 5 is based on a transformation into a Cartesian coordinate system. As can be readily taken from FIG. 5, the data points illustrated therein all look very similar without any label or annotation that allows differentiating them or indicating what they represent, e.g. to which object 107 they belong.

Figure 6:
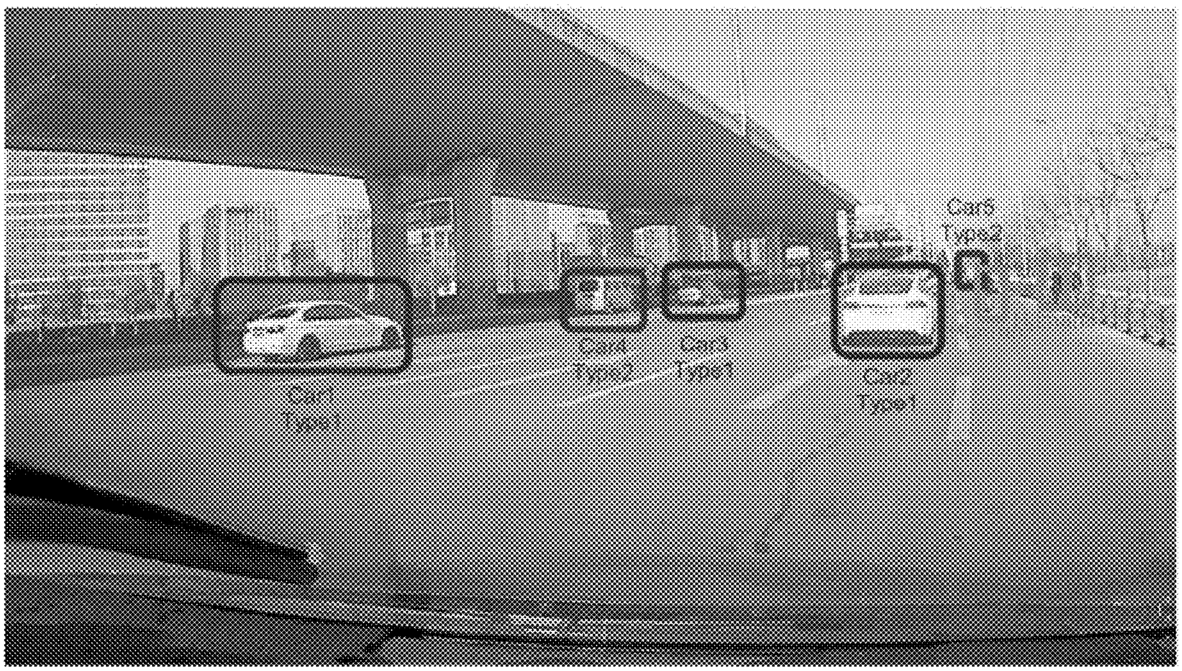
FIG. 6 shows the exemplary image of the traffic scenario of FIG. 4 together with identifications of several objects appearing therein.

Using the techniques described above, in particular in the context of FIG. 3, the processing circuitry 102 of the sensing apparatus 101 is configured to annotate the raw point cloud data shown in FIG. 5 by applying object recognition techniques to the image shown in FIG. 4 in order to generate a labeled image as shown in FIG. 6. As will be appreciated, in FIG. 6 various vehicles and pedestrians have been identified and classified by the processing circuitry 102 of the sensing apparatus 101.

Figure 7:
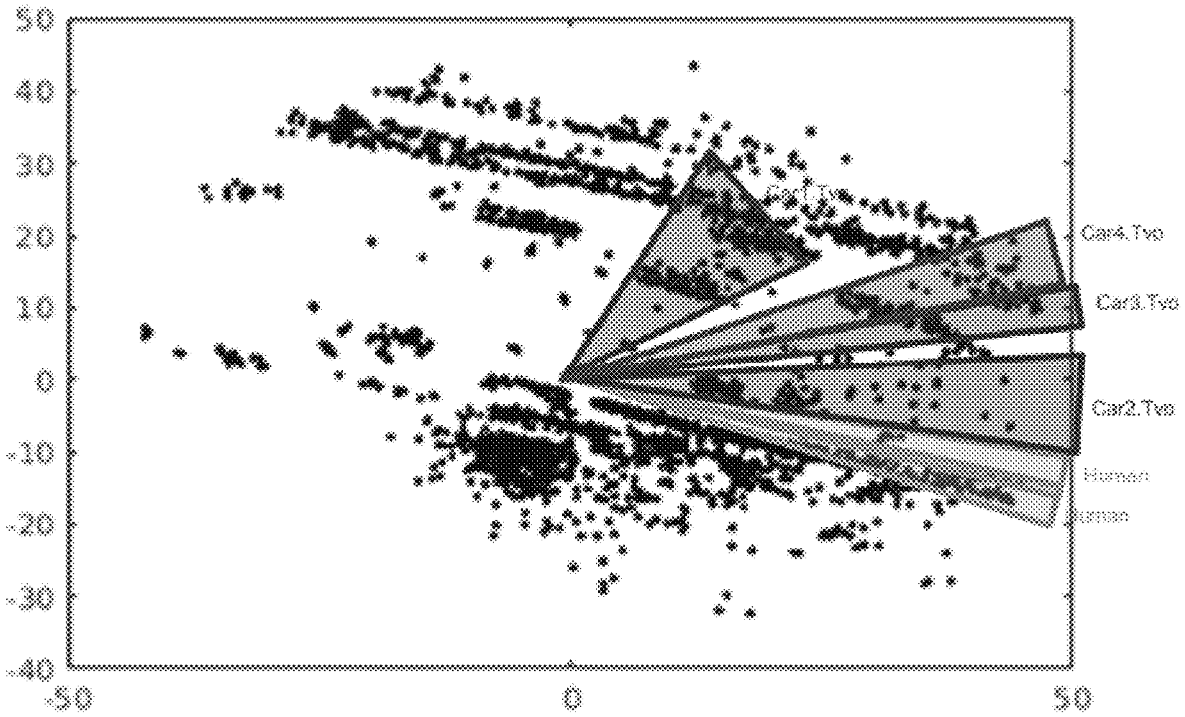
FIG. 7 shows the data point cloud of FIG. 5 with the additional identification information shown in FIG. 6.
Figure 8:
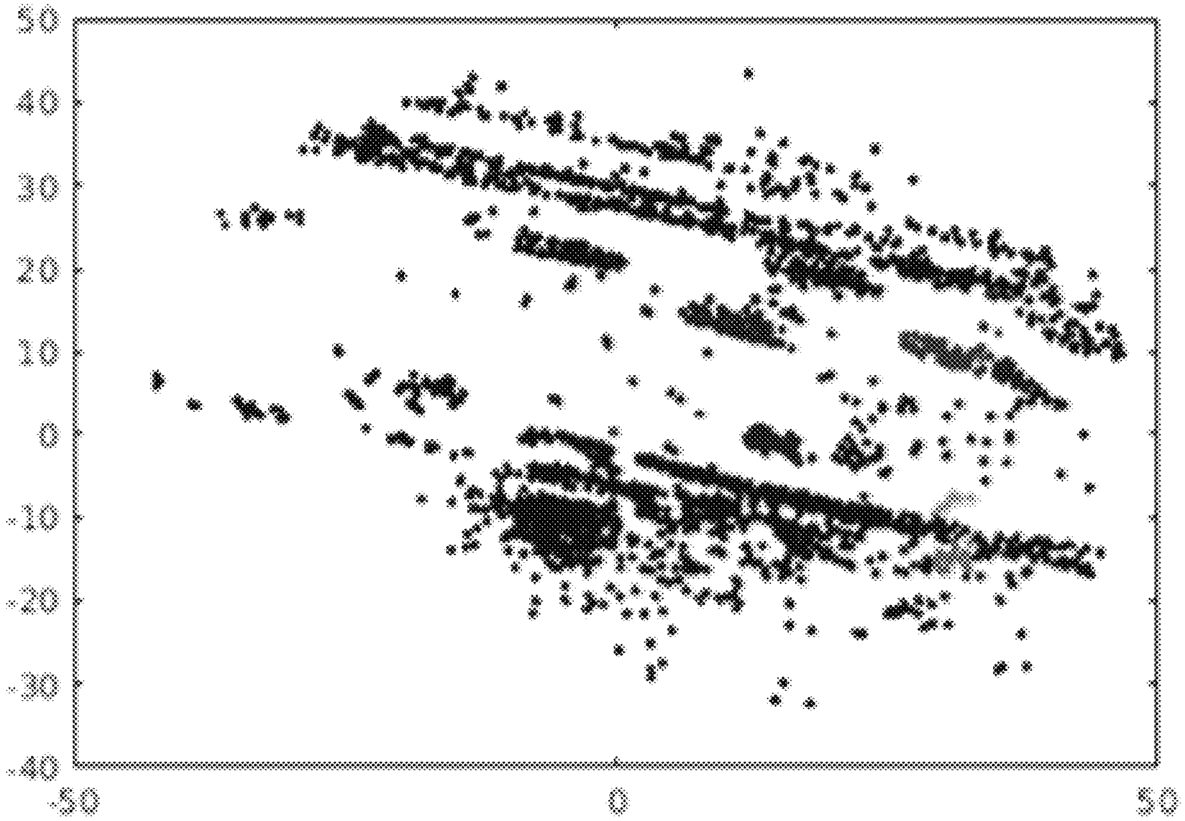
FIG. 8 shows the point cloud of FIG. 5 with several labelled data points as provided by the sensing apparatus according to an embodiment.

According to an embodiment, the processing circuitry 102 is further configured to determine on the basis of these objects 107 and their position in the image, as illustrated in FIG. 6, the potential zones or regions of the point cloud space, where they should be located. In FIG. 7 these zones are shown in the same Cartesian coordinate system as the raw data provided by the radar and/or lidar sensors 103 and have a substantially triangular shape used for visualization purposes. By performing an intersection through a confidence measure (for example probability-based, distance based) between the potential zones, and the acquired point cloud, the processing circuitry 102 can identify the subset in the point cloud data that best represents the identified object 107 on the image and thus label it accordingly as depicted on FIG. 8.

As will be appreciated, the processing techniques employed in the first exemplary embodiment may be enhanced by more advanced processing techniques, such as by using multiple images of the traffic scenario 100 in the vicinity of the car 106 from more than one camera 105 and/or by using cross image object tracking for consistency and ease of detection. This may also be helpful for handling hidden objects to the camera(s) 105, but visible to the radar sensors 103.

Figure 10:
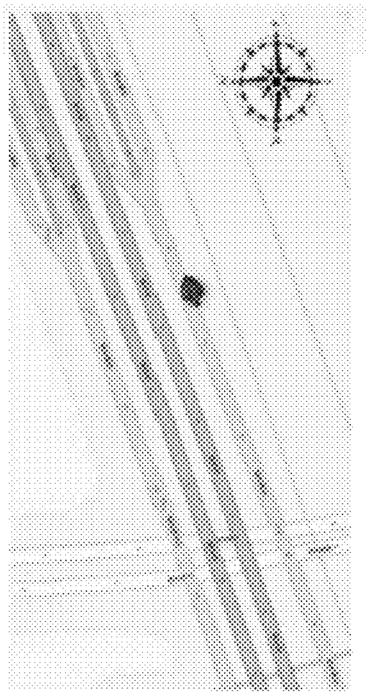
FIG. 10 shows an image illustrating exemplary map information used by a sensing apparatus according to an embodiment for labelling the point cloud of FIG. 9.
Figure 9:
FIG. 9 shows the exemplary point cloud of unlabeled radar data of FIG. 5 with the position and motion direction of the sensing apparatus according to an embodiment.
Figure 11:
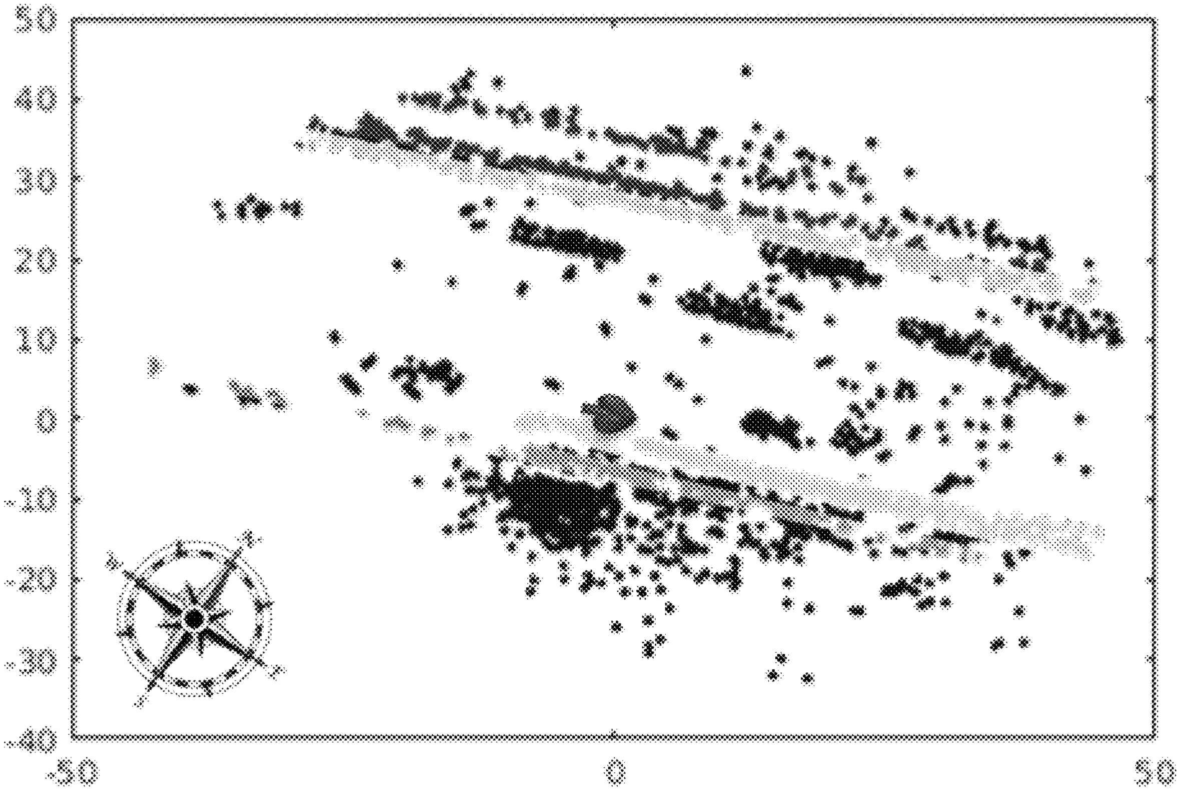
FIG. 11 shows the labelled point cloud determined by a sensing apparatus according to an embodiment on the basis of the map data illustrated in FIG. 10.

The second exemplary embodiment, which will be described in more detail in the context of FIGS. 9 to 11, differs from the first exemplary embodiment described above primarily in that instead of image data odometry data and/or GPS data are used by the processing circuitry 102 as auxiliary data for labelling the point cloud of raw data provided by the radar sensors 103. FIG. 9 shows the point cloud of FIG. 5 with the position and the direction of motion of the car 106 illustrated by the spade-shaped symbol. Taking into account the location of the car 106 by considering its GPS data/coordinates obtainable, for instance, from a GPS sensor of the car 106 as wells the speed and direction of motion of the car 106 obtainable, for instance, from an onboard magnetometer and accelerometer or a tachymeter of the car 106, the processing circuitry 102 of the sensing apparatus 101 may even make use of other types of auxiliary data, such as the map illustrated in FIG. 10 in order to extract information about the current traffic scenario 100 and assist to annotate the point cloud data with road information. For instance, superposing the structure of the roads, as can be obtained from the map illustrated in FIG. 10, onto the point cloud of FIG. 9 provides valuable information about the number of lines the processing circuitry 102 has process in the point cloud data, as depicted in FIG. 11. Advanced map information, such as the location and sizes of buildings that are today available in open source maps, may provide for a more accurate labelling of the point cloud data especially in densely populated urban areas.

Figure 12:
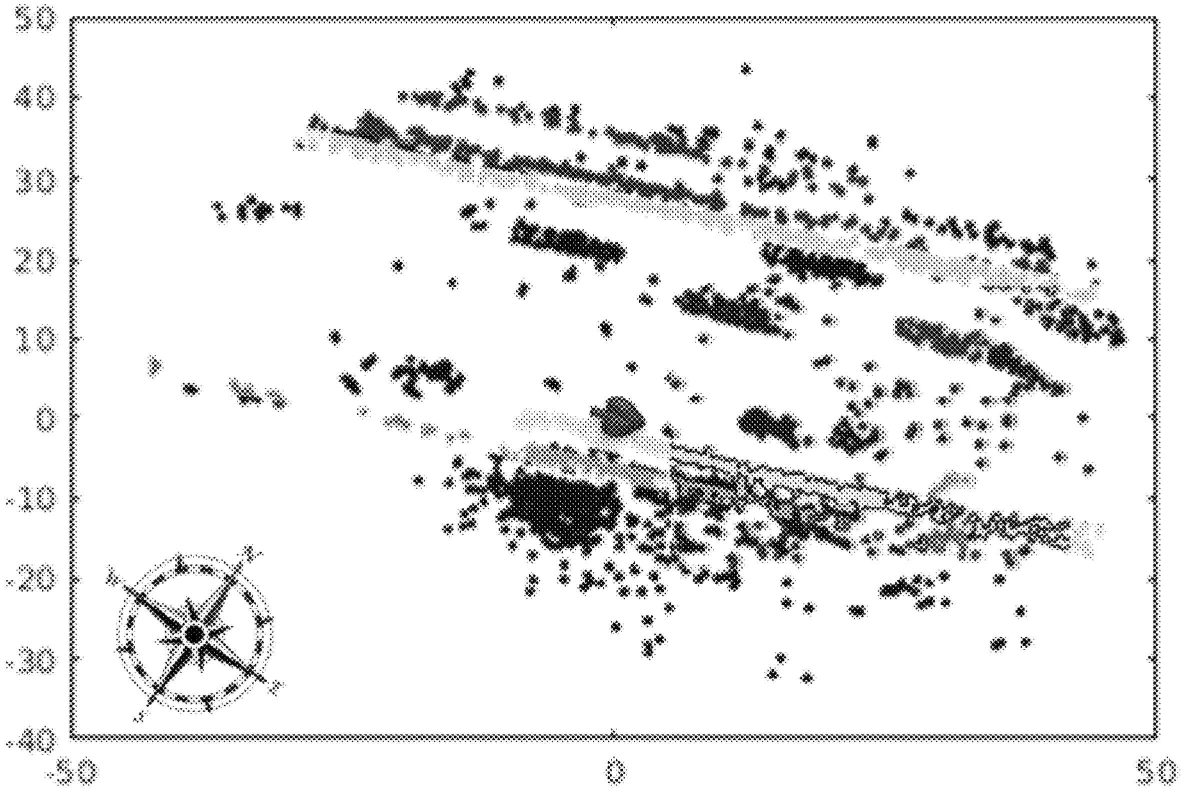
FIG. 12 shows the labelled point cloud determined by a sensing apparatus according to an embodiment on the basis of the image data illustrated in FIG. 4 and the map data illustrated in FIG. 10.

FIG. 12 illustrates a labelled, anointed point cloud which has been generated by the processing circuitry 102 combining the two exemplary embodiments described above. To this end, the processing circuitry 102 may be configured to employ data fusion techniques. As can be taken from FIG. 12, this allows labelling an even larger number of the data points of the point cloud. For instance, the processing block 305 shown in FIG. 3 may provide respective speed estimations of identified objects based on odometry and radar information. Then, the point cloud with a computed absolute speed equal to zero (0 being the absolute speed of static objects) at a given distance from the car 106 combined with the GPS position of the car 106 allows annotating the data points of the point cloud that are related to the road edge. This annotation may be based on data fusion based on the raw radar data, odometry and/or GPS information.

Figure 13:
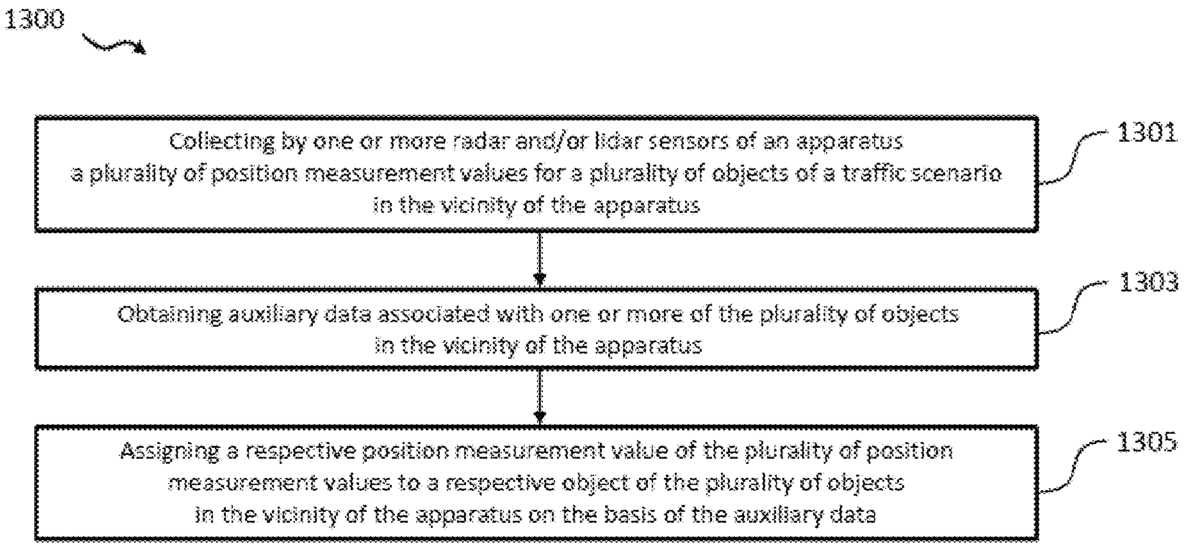
FIG. 13 is a flow diagram illustrating a sensing method according to an embodiment.

FIG. 13 is a flow diagram illustrating a sensing method 1300 according to an embodiment. The method 1300 comprises the steps of collecting 1301 by the one or more radar and/or lidar sensors 103 of the digital processing apparatus 101 a plurality of position, e.g. distance and/or direction measurement values for the plurality of objects 107 of a traffic scenario 100 in the vicinity of the apparatus 101; obtaining 1303 auxiliary data associated with one or more of the plurality of objects 107 in the vicinity of the apparatus 101; and assigning 1305, e.g. mapping a respective position measurement value of the plurality of position measurement values to a respective object of the plurality of objects 107 in the vicinity of the apparatus 101 on the basis of the auxiliary data. The sensing method 1300 can be performed by the sensing apparatus 101. Thus, further features of the sensing method 1300 result directly from the functionality of the sensing apparatus 101 and its different embodiments described above.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

What is claimed is:

1. A sensing apparatus, comprising:

at least one of a radar sensor or a lidar sensor configured to collect unlabeled point cloud data comprising a position measurement value of a plurality of position measurement values of an object of a plurality of objects of a traffic scenario in a vicinity of the sensing apparatus; and one or more processors coupled to at least one of the radar sensor or the lidar sensor and configured to:

obtain auxiliary data associated with the object of the plurality of objects in the vicinity of the sensing apparatus, wherein the auxiliary data comprises at least one image of the object;

implement, using a machine learning algorithm for object classification and detection, a neural network via processing circuitry comprising an application-specific integrated circuit (ASIC) to identify the object based on the at least one image to obtain an identified object;

determine an auxiliary position value for the object in the vicinity of the sensing apparatus, wherein the auxiliary position value comprises distance information for the object and direction information for the object;

compare the position measurement value to the auxiliary position value;

assign the position measurement value of the unlabeled point cloud data to the identified object in the vicinity of the sensing apparatus based on the auxiliary position value; and assign the position measurement value of the unlabeled point cloud data to the object based on the auxiliary data for labelling the unlabeled point cloud data, wherein the labelling of the unlabeled point cloud data is performed without processing the unlabeled point cloud data for object detection.

2. The sensing apparatus of claim 1, further comprising at least one camera configured to capture the at least one image of the object.

3. The sensing apparatus of claim 2, wherein the at least one camera comprises a stereoscopic camera, and wherein the stereoscopic camera is further configured to further capture the at least one image as a stereoscopic image of the object.

4. The sensing apparatus of claim 2, wherein the at least one camera comprises an omnidirectional camera, and wherein the omnidirectional camera is further configured to further capture the at least one image as an omnidirectional image of the object.

5. The sensing apparatus of claim 1, wherein the one or more processors is further configured to:

determine an angular extension value of the object in the vicinity of the sensing apparatus based on the at least one image; and assign the position measurement value to the object of the plurality of objects in the vicinity of the sensing apparatus based on the angular extension value.

6. The sensing apparatus of claim 1, wherein the at least one image comprises a temporal sequence of images of the object in the vicinity of the sensing apparatus, wherein the at least one of the radar sensor or the lidar sensor is further configured to collect at least one velocity measurement value for the object, and wherein the one or more processors is further configured to:

determine an auxiliary velocity value of the object; and assign the position measurement value to the object based on the at least one velocity measurement value and the auxiliary velocity value.

7. The sensing apparatus of claim 1, wherein the unlabeled point cloud data comprises a random set of sparse data measurements.

8. A vehicle comprising:

a sensing apparatus comprising:

at least one of a radar sensor or a lidar sensor and that is configured to collect unlabeled point cloud data comprising a position measurement value for an object of a plurality of objects of a traffic scenario in a vicinity of the sensing apparatus; and one or more processors coupled to at least one of the radar sensor or the lidar sensor and configured to:

obtain auxiliary data associated with the object in the vicinity of the sensing apparatus, wherein the auxiliary data comprises at least one image of the object;

implement, using a machine learning algorithm for object classification and detection, a neural network via processing circuitry comprising an application-specific integrated circuit (ASIC) to identify the object based on the at least one image to obtain an identified object;

determine an auxiliary position value for the object in the vicinity of the sensing apparatus, wherein the auxiliary position value comprises distance information for the object and direction information for the object;

compare the position measurement value to the auxiliary position value;

assign the position measurement value of the unlabeled point cloud data to the identified object in the vicinity of the sensing apparatus based on the auxiliary position value; and assign the position measurement value of the unlabeled point cloud data to the object based on the auxiliary data for labelling the unlabeled point cloud data, wherein the labelling of the unlabeled point cloud data is performed without processing the unlabeled point cloud data for object detection.

9. The vehicle of claim 8, wherein the sensing apparatus further comprises at least one camera configured to capture the at least one image of the object.

10. The vehicle of claim 9, wherein the at least one camera comprises at least one of a stereoscopic camera or an omnidirectional camera, wherein the stereoscopic camera is further configured to further capture the image as a stereoscopic image of the object, and wherein the omnidirectional camera is configured to capture the image as an omnidirectional image of the object.

11. The vehicle of claim 8, wherein the one or more processors is further configured to:

determine an angular extension value of the object in the vicinity of the sensing apparatus based on the at least one image; and assign the position measurement value to the object of the plurality of objects in the vicinity of the sensing apparatus based on the angular extension value.

12. The vehicle of claim 8, wherein the at least one image comprises a temporal sequence of images of the object in the vicinity of the sensing apparatus.

13. The vehicle of claim 8, wherein the at least one of the radar sensor or the lidar sensor is further configured to collect at least one velocity measurement value for the object, wherein the one or more processors is further configured to:

determine an auxiliary velocity value of the object; and assign the position measurement value to the object based on the at least one velocity measurement value and the auxiliary velocity value.

14. The vehicle of claim 8, wherein the unlabeled point cloud data comprises a random set of sparse data measurements.

15. A sensing method, comprising:

collecting, by at least one of a radar sensor or a lidar sensor of an apparatus, unlabeled point cloud data comprising a position measurement value of a plurality of position measurement values of an object of a plurality of objects of a traffic scenario in a vicinity of the apparatus;

obtaining, by one or more processors of the apparatus, auxiliary data associated with the object in the vicinity of the apparatus, wherein the auxiliary data comprises at least one image of the object;

implementing, by the one or more processors using a machine learning algorithm for object classification and detection, a neural network via processing circuitry comprising an application-specific integrated circuit (ASIC) to identify the object based on the at least one image to obtain an identified object;

determining, by the one or more processors, an auxiliary position value for the object in the vicinity of the apparatus, wherein the auxiliary position value comprises distance information for the object and direction information for the object;

comparing, by the one or more processors, the position measurement value to the auxiliary position value;

assigning, by the one or more processors, the position measurement value of the unlabeled point cloud data to the identified object in the vicinity of the apparatus based on the auxiliary position value; and assigning, by the one or more processors, the position measurement value of the unlabeled point cloud data to the object based on the auxiliary data for labelling the unlabeled point cloud data, wherein the labelling of the unlabeled point cloud data is performed without processing the unlabeled point cloud data for object detection.

16. The sensing method of claim 15, further comprising capturing, with a stereoscopic camera of the apparatus, the at least one image as a stereoscopic image of the object.

17. The sensing method of claim 15, further comprising capturing, with an omnidirectional camera of the apparatus, the at least one image as an omnidirectional image of the object.

18. The sensing method of claim 15, further comprising:

determining, by the one or more processors, an angular extension value of the object in the vicinity of the apparatus based on the at least one image; and assigning, by the one or more processors, the position measurement value to the object of the plurality of objects in the vicinity of the apparatus based on the angular extension value.

19. The sensing method of claim 15, wherein the unlabeled point cloud data comprises a random set of sparse data measurements.

* * * * *